United States Patent
Nojiri

(10) Patent No.: US 9,350,433 B2
(45) Date of Patent: May 24, 2016

(54) TRANSMITTING APPARATUS, RECEIVING APPARATUS, TRANSMITTING METHOD AND RECEIVING METHOD THAT WIRELESSLY COMMUNICATE WITH EACH OTHER USING PLURALITY OF ANTENNAS

(71) Applicant: JVC KENWOOD Corporation, Yokohama-shi (JP)

(72) Inventor: Seiwa Nojiri, Yokosuka (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 217 days.

(21) Appl. No.: 14/260,016

(22) Filed: Apr. 23, 2014

(65) Prior Publication Data

US 2014/0233552 A1   Aug. 21, 2014

Related U.S. Application Data

(63) Continuation of application No. PCT/JP2012/004808, filed on Jul. 27, 2012.

(30) Foreign Application Priority Data

Oct. 24, 2011  (JP) .................. 2011-233193

(51) Int. Cl.
   H04W 4/00       (2009.01)
   H04B 7/04       (2006.01)
   H04B 7/06       (2006.01)
   H04B 7/08       (2006.01)

(52) U.S. Cl.
   CPC ............. *H04B 7/046* (2013.01); *H04B 7/0413* (2013.01); *H04B 7/0615* (2013.01); *H04B 7/0842* (2013.01)

(58) Field of Classification Search
   USPC .................. 370/252, 328, 338, 401
   See application file for complete search history.

(56) References Cited

U.S. PATENT DOCUMENTS 7,561,632 B1 *  7/2009  van Zelst ............. H04B 7/0619
                                                    375/267
2003/0218973 A1 * 11/2003 Oprea .................. H04B 7/0434
                                                    370/210

(Continued)

FOREIGN PATENT DOCUMENTS

JP   2008-236054 A   10/2008
JP   2009-049966 A   3/2009

OTHER PUBLICATIONS

International Search Report in PCT International Application No. PCT/JP2012/004808, dated Aug. 21, 2012.
International Preliminary Report on Patentability and Written Opinion in PCT International Application No. PCT/JP2012/004808, dated Apr. 29, 2014.

*Primary Examiner* — Ricky Ngo
*Assistant Examiner* — Christine Ng
(74) *Attorney, Agent, or Firm* — Venable LLP; Michael A. Sartori

(57) ABSTRACT

An acquiring unit acquires a channel matrix, which has elements representing the channel characteristics between a plurality of antennas at a transmitting side and a plurality of antennas at a receiving side, respectively. A first derivation unit derives not only a singular value matrix that is a diagonal matrix where singular values are arranged, by subjecting the channel matrix to the singular value decomposition, but also a weight matrix which is a unitary matrix corresponding to the singular value matrix. A second derivation unit derives the degree of difference between the singular values arranged in the singular value matrix. A determining unit determines whether or not the degree of difference lies within a predetermined range.

6 Claims, 7 Drawing Sheets

(56) References Cited

U.S. PATENT DOCUMENTS

| | | | |
|---|---|---|---|
| 2010/0214964 A1* | 8/2010 | Larsson | H01Q 3/2605 370/277 |
| 2010/0296607 A1* | 11/2010 | Tuskamizu | H04B 7/0848 375/316 |
| 2011/0242962 A1* | 10/2011 | Hayase | H04B 7/0426 370/203 |

* cited by examiner

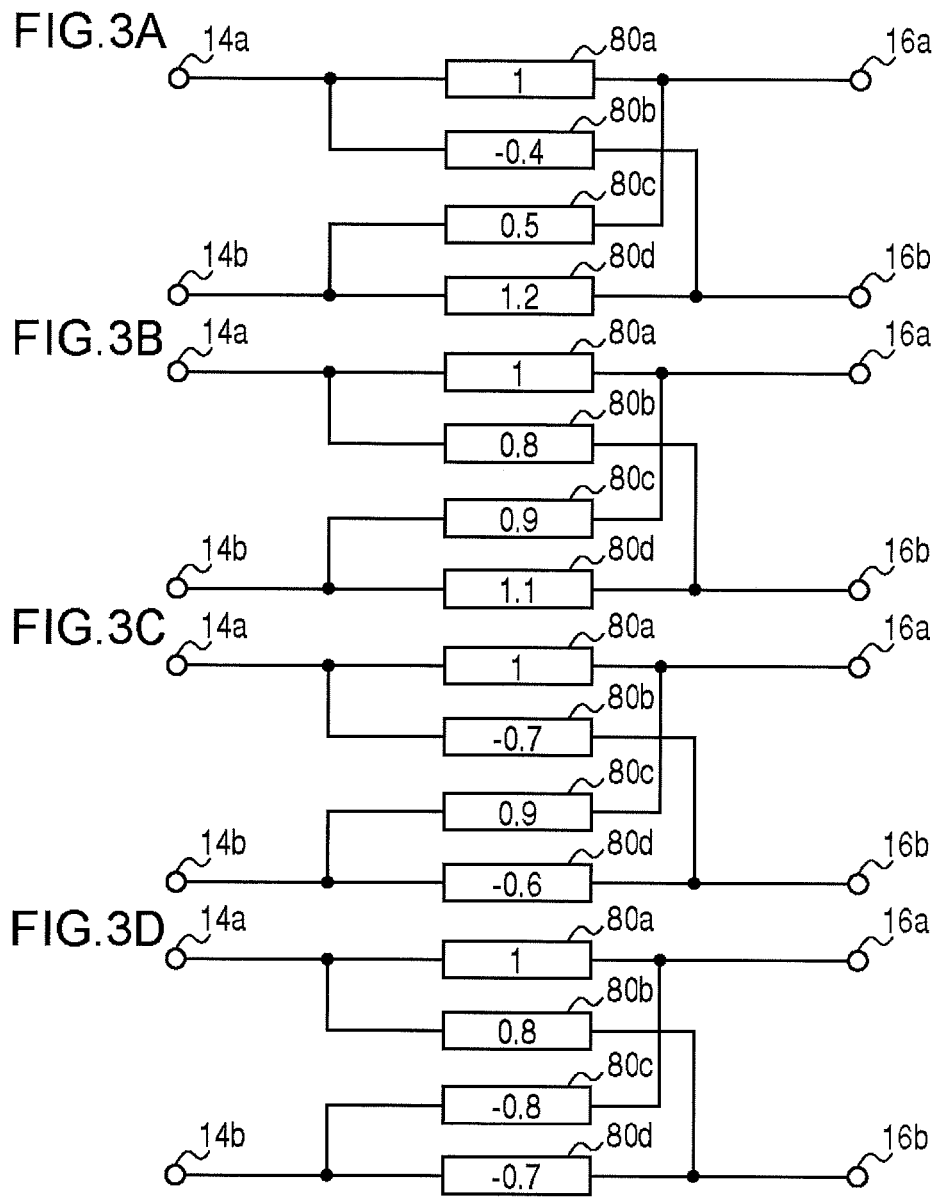

| TRAINING SIGNAL | COMPLEMENTATION PRESENCE/ABSENCE SIGNAL | DATA SIGNAL |
|---|---|---|
| | | |
| TRAINING SIGNAL | COMPLEMENTATION PRESENCE/ABSENCE SIGNAL | DATA SIGNAL |

TRANSMITTING APPARATUS, RECEIVING APPARATUS, TRANSMITTING METHOD AND RECEIVING METHOD THAT WIRELESSLY COMMUNICATE WITH EACH OTHER USING PLURALITY OF ANTENNAS

BACKGROUND OF THE INVENTION

1. Field of the Invention

The present invention relates to a communication technology, and it particularly relates to a transmitting apparatus and a receiving apparatus that wirelessly communicate with each other using a plurality of antennas, a transmitting method and a receiving method.

2. Description of the Related Art

Faster communication speed is required for a radio communication system such as a wireless LAN. One of techniques to realize the faster communication is MIMO (Multiple-Input and Multiple-Output). In MIMO, signal streams, which are independent of a plurality of transmitting antennas, are spatial-multiplexed and transmitted, and are received by a plurality of receiving antennas. The received signal streams are demodulated based on a matrix representing the channel characteristics between a plurality of transmitting and a plurality of receiving antennas, respectively (see Reference (1) and Reference (2) in the following Related Art List, for instance).

RELATED ART LIST (1) Japanese Unexamined Patent Application Publication No. 2008-236054.
(2) Japanese Unexamined Patent Application Publication No. 2009-49966.

To achieve the multiplex transmission in MIMO, generally desired are independent channels in accordance with the number of signal streams to be transmitted. Such channels correspond to a space where the correlation is low (for example, a space having the reflected waves). In such a case, each parameter such as the amplitude, phase, and delay differs. However, there are cases when the radio communication system is used in a space where the correlation is high. The space where the correlation is high is close to a non-reflective space, for instance. In this case, the correlation in any of parameters of the amplitude, phase and delay will be high. As a result, it is difficult to separate data at a receiving side, thereby making it difficult to perform the multiple transmission.

SUMMARY OF THE INVENTION

The present invention has been made in view of the foregoing circumstances, and a purpose thereof is to provide a technology that achieves multiplex transmission in various types of channel environments.

To resolve the above-described problems, a transmitting apparatus according to one embodiment of the present invention includes: an acquiring unit for acquiring a channel matrix, the channel matrix having elements that represent channel characteristics between a plurality of antennas at a transmitting side and a plurality of antennas at a receiving side, respectively; a first derivation unit for deriving a singular value matrix that is a diagonal matrix where singular values are arranged, by subjecting the channel matrix acquired by the acquiring unit, to singular value decomposition, and for deriving a weight matrix which is a unitary matrix corresponding to the singular value matrix; a second derivation unit for deriving a degree of difference between the singular values arranged in the singular value matrix derived by the first derivation unit; a determining unit for determining whether or not the degree of difference lies within a predetermined range; and a transmitter for transmitting, from the plurality of antennas, a result of computation of a weight vector, contained in the weight matrix, and a signal, when the determining unit determines that the degree of difference lies within the predetermined range, and for transmitting, from the plurality of antennas, a result of computation of the weight vector, contained in the weight matrix, the signal, and a correction matrix, when the determining unit determines that the degree of difference lies outside the predetermined range.

By employing this embodiment, whether a combination of the weight vector and the correction matrix is used or the weight vector is used is determined according to the degree of difference between the singular values. Thus, the multiplex transmission can be achieved in various types of channel environments.

The transmitting apparatus may further include: a storage for storing the channel matrix acquired by the acquiring unit, when the determining unit determines that the degree of difference lies within the predetermined range; and a generator for generating the correction matrix based on the channel matrix acquired by the acquiring unit and the channel matrix stored in the storage, when the determining unit determines that the degree of difference lies outside the predetermined range. In this case, the correction matrix is generated, based on a channel matrix whose degree of difference lies within the range and a channel matrix whose degree of difference lies outside the range. Thus, the corrected matrix can be brought close to a channel matrix whose degree of difference lies within the range.

When the results of computation of the correction matrix, the weight matrix and the signal are transmitted from the plurality of antennas, the transmitting apparatus conveys the use of the correction matrix. Since the use of the correction matrix is conveyed in this case, processes suitable for the use of the correction matrix can be executed.

Another embodiment of the present invention relates to a receiving apparatus. The apparatus includes: a receiver for receiving a signal from a transmitting apparatus via a plurality of antennas, wherein the transmitting apparatus derives a singular value matrix which is a diagonal matrix where singular values are arranged, and a weight matrix which is a unitary matrix corresponding to the singular value matrix, by subjecting a channel matrix to singular value decomposition, the channel matrix having elements that represent channel characteristics between a plurality of antennas at a transmitting side and the plurality of antennas at a receiving side, respectively, and wherein, when a degree of difference between the singular values arranged in the single value matrix lies within a predetermined range, the transmitting apparatus weights the signal with a transmission weight vector contained in the weight matrix; a derivation unit for deriving a receiving weight vector based on the signal received by the receiver; and a processing unit for performing array synthesis on the signal received by the receiver, using the receiving weight vector derived by the derivation unit. When the degree of difference between the singular values arranged in the single value matrix lies outside predetermined range, the receiver receives a signal computed with the transmission weight vector and a correction matrix; when the degree of difference between the singular values arranged in the single value matrix lies outside predetermined range, the derivation unit stops deriving the receiving weight vector; and, when the degree of difference between the singular values arranged in the single value matrix lies outside the predetermined range, the processing unit performs array synthesis on the signal received by the receiver, using the receiving weight vector derived previously by the derivation unit.

By employing this embodiment, whether a combination of the weight vector and the correction matrix is used or the weight vector is used is determined according to the degree of difference between the singular values. Thus, the multiplex transmission can be achieved in various types of channel environments.

Still another embodiment of the present invention relates to a transmitting method. The method includes: acquiring a channel matrix, having elements that represent channel characteristics between a plurality of antennas at a transmitting side and a plurality of antennas at a receiving side, respectively; deriving a singular value matrix that is a diagonal matrix where singular values are arranged, by subjecting the channel matrix acquired to singular value decomposition, and deriving a weight matrix which is a unitary matrix corresponding to the singular value matrix; deriving a degree of difference between the singular values arranged in the singular value matrix derived; determining whether or not the degree of difference lies within a predetermined range; and transmitting, from the plurality of antennas, a result of computation of a weight vector, contained in the weight matrix, and a signal, when the degree of difference lies within the predetermined range, and transmitting, from the plurality of antennas, a result of computation of the weight vector, contained in the weight matrix, the signal, and a correction matrix, when the degree of difference lies outside the predetermined range.

Still another embodiment of the present invention relates to a receiving method. The method includes: receiving a signal from a transmitting apparatus via a plurality of antennas, wherein the transmitting apparatus derives a singular value matrix which is a diagonal matrix where singular values are arranged, and a weight matrix which is a unitary matrix corresponding to the singular value matrix, by subjecting a channel matrix to singular value decomposition, the channel matrix having elements that represent channel characteristics between a plurality of antennas at a transmitting side and the plurality of antennas at a receiving side, respectively, and wherein, when a degree of difference between the singular values arranged in the single value matrix lies within a predetermined range, the transmitting apparatus weights the signal with a transmission weight vector contained in the weight matrix; deriving a receiving weight vector based on the received signal; and performing array synthesis on the received signal, using the receiving weight vector derived. When the degree of difference between the singular values arranged in the single value matrix lies outside predetermined range, the receiving receives a signal computed with the transmission weight vector and a correction matrix; when the degree of difference between the singular values arranged in the single value matrix lies outside the predetermined range, the deriving stops deriving the receiving weight vector; and, when the degree of difference between the singular values arranged in the single value matrix lies outside the predetermined range, the performing performs array synthesis on the received signal, using the receiving weight vector derived previously by the derivation unit.

Optional combinations of the aforementioned constituting elements, and implementations of the invention in the form of methods, apparatuses, systems, recording media, computer programs and so forth may also be practiced as additional modes of the present invention.

BRIEF DESCRIPTION OF THE DRAWINGS

Embodiments will now be described by way of examples only, with reference to the accompanying drawings, which are meant to be exemplary, not limiting and wherein like elements are numbered alike in several Figures in which:

FIG. 3A to 3D shows examples of channel characteristics in the communication system of FIG. 1;

FIG. 4A to FIG. 4C show examples of the settings in a first adding unit to a fourth adding unit shown in FIG. 2;

FIG. 6 shows a structure of a receiving apparatus shown in FIG. 1;

DETAILED DESCRIPTION OF THE INVENTION

An outline of the present invention will be given before a specific description thereof. Exemplary embodiments of the present invention relate to a communication system that carries out MIMO transmission and it particularly relates to a communication system that determines a transmission weight vector by singular value decomposition (SVD). As described earlier, the lower the spatial correlation is, the more capable the multiplex transmission by MIMO becomes. In contrast, as the spatial correlation gets higher, it is more difficult to separate data at a receiving side, which is not suitable for the multiplex transmission. Accordingly, it is desired that MIMO transmission be achieved even though the spatial correlation is high. Since the amount of computation generally tends to increase at the receiving side in MIMO, it is also desired to suppress the increase in the amount of computation. For these reasons, the communication system according to the present exemplary embodiment executes the following processes.

A transmitting apparatus acquires a channel matrix. The channel matrix is a matrix whose entries represent channel characteristics between a plurality of antennas at a transmitting side and a plurality of antennas at a receiving side, respectively. The transmitting apparatus performs SVD on the channel matrix so as to acquire a unitary matrix. A unitary matrix is equivalent to a set of transmission weight vectors to be multiplied by a plurality of streams in MIMO, respectively. A value where a lager value in SVD is divided by a smaller value in SVD is calculated. This value will be hereinafter referred to as a "singular value ratio". The closer the singular value ratio is to "1", the lower the spatial correlation is; the larger the singular value ratio is, the higher the spatial correlation becomes. If the singular value is close to "1", the weighting will be done using the transmission weight vector in a similar manner to the normal MIMO transmission by SVD.

If, on the other hand, the singular value gets larger, the transmitting apparatus will generate a correction matrix and then weight the correction matrix with the transmission weight vector and simultaneously carry out an operation using the correction matrix. Here, the correction matrix is derived by subtracting a channel matrix, at the time the spatial correlation is high, from a channel matrix, at the time the spatial correlation is low. In this manner, the correction matrix is used when the spatial correlation is high. Thus, a stable MIMO transmission can be achieved regardless of the spatial correlation.

Figure 1:
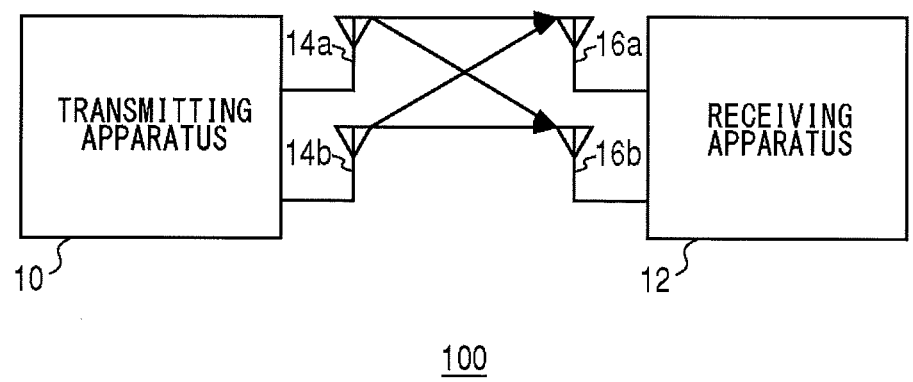
FIG. 1 shows a structure of a communication system according to an exemplary embodiment of the present invention.

FIG. 1 shows a structure of a communication system 100 according to an exemplary embodiment of the present invention. The communication system 100 includes a transmitting apparatus 10 and a receiving apparatus 12. The transmitting apparatus 10 includes a first transmitting antenna 14a and a second transmitting antenna 14b, which are generically referred to as "transmitting antenna 14" or "transmitting antennas 14". The receiving apparatus 12 includes a first receiving antenna 16a and a second receiving antenna 16b, which are generically referred to as "receiving antenna 16" or "transmitting antennas 16".

Here, a combination of transmission signals transmitted from the two transmitting antennas 14 (the combination thereof will be hereinafter referred to as "transmitted signal vector"), respectively, is denoted by "X". A combination of receiving signals received by the two receiving antennas 16 (the combination thereof will be hereinafter referred to as "received signal vector"), respectively, is denoted by "R". Further, a matrix whose entries or elements are the channel characteristics between the two transmitting antennas 14 and the two receiving antennas 16 (hereinafter referred to as "channel matrix") is denoted by "H". Note that a transmitted signal vector and a received signal vector each has two elements therein, whereas each channel matrix has four elements therein. A received signal vector is expressed as follows.

$$R = HX \tag{1}$$

For the clarity of explanation, noise will be ignored herein. When SVD is applied to a channel matrix, its result is expressed as follows.

$$H = U\Sigma V^H \tag{2}$$

U and V are each a unitary matrix, and $\Sigma$ is a singular value matrix with singular values on the diagonal. When the transmitting apparatus 10 sets the transmission weight vector to "V", Equation (1) is expressed as follows.

$$R = HVX = U\Sigma X \tag{3}$$

When the receiving apparatus 12 sets a receiving weight vector to "$V^H$", an array signal processing result Y is expressed as follows.

$$Y = U^H R = \Sigma X \tag{4}$$

Since, as described above, $\Sigma$ is a singular value matrix, the transmitted signal vector X is received with a gain that is equal to the magnitude of the singular values. Finally, the transmitted signal vector X is acquired as follows.

$$X = \Sigma^{-1} Y \tag{5}$$

The above processing will be carried out by the following procedure. The receiving apparatus 12 derives a channel matrix H, based on signals sent from the transmitting apparatus 10. The receiving apparatus 12 feeds back the channel matrix H to the transmitting apparatus 10, and then the transmitting apparatus 10 computes a V matrix (hereinafter referred to as "weight matrix") from the channel matrix H. A known technique may be used for these processing and therefore the description thereof is omitted here.

The transmitting apparatus 10 transmits a signal where a matrix P for a signal (preamble) for channel matrix estimation is multiplied by a weight matrix. A receiving preamble matrix in the receiving apparatus 12 is expressed as follows.

$$Z = HVP = U\Sigma P \tag{6}$$

The receiving apparatus 12 estimates the channel matrix from the receiving preamble matrix as follows.

$$E = Z*P^{-1} = U\Sigma \tag{7}$$

At this time, the estimated channel matrix E is derived as $U\Sigma$ not as H.

Subsequent to this derivation, the transmitting apparatus 10 transmits the transmitted signal vector, whereas the receiving apparatus 12 acquires the received signal vector. The received signal vector is expressed as in Equation (3). The receiving apparatus 12 acquires the transmitted signal vector X by decoding the received signal vector R. Since an equivalent channel of the transmitted signal vector X as seen from the receiving apparatus 12 is s $U\Sigma$, the transmitted signal vector X is acquired by canceling $U\Sigma$ from the received signal vector. Note that $U\Sigma$ had already been estimated as the estimated channel matrix E.

If, for example, the receiving is done using a zero-forcing (ZF) algorithm (this receiving process will be hereinafter referred to as "ZF receiving" also), it will be expressed as follows.

$$E^{-1}R = \Sigma^{-1} U^H U\Sigma X = X \tag{8}$$

In other words, the preamble for channel estimation is multiplied by the weight matrix, too, and thereby the channel matrix estimated by the receiving apparatus 12 is formed by U matrices and $\Sigma$ matrices. In the transmitting apparatus 10, the estimated channel matrix is used and thereby the transmitted signal vector X is acquired by the ZF receiving or the like. Further, in the present exemplary embodiment, an additional processing is carried out depending on the size of spatial correlation. This processing will be discussed later.

Figure 2:
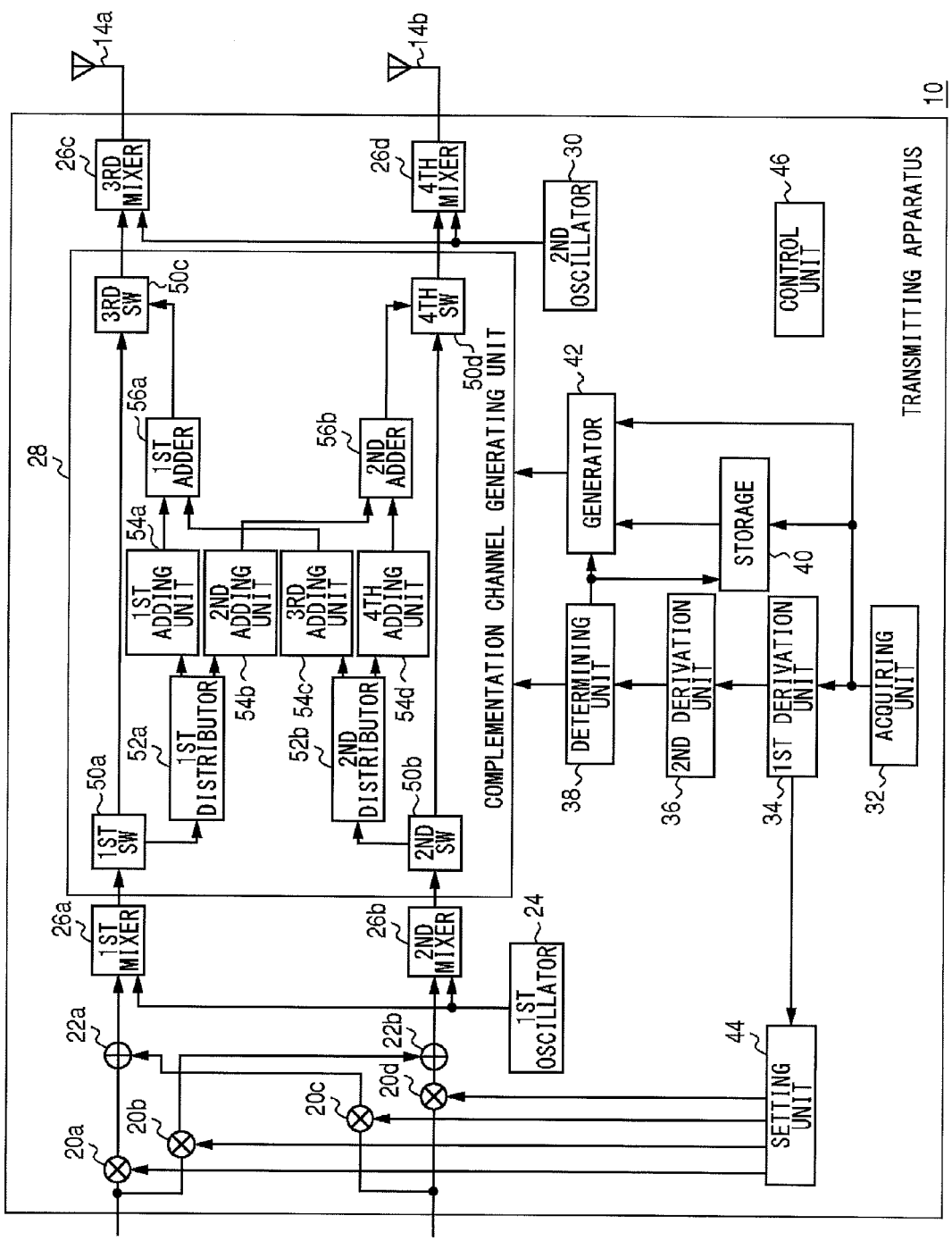
FIG. 2 shows a structure of a transmitting apparatus shown in FIG. 1.

FIG. 2 shows a structure of a transmitting apparatus 10. The transmitting apparatus 10 includes a first multiplication unit 20a, a second multiplication unit 20b, a third multiplication unit 20c, and a fourth multiplication unit 20d, which are generically referred to as "multiplication units 20" or "multiplication unit 20", a first addition unit 22a and a second addition unit 22b, which are generically referred to as "addition units 22" or "addition unit 22", a first oscillator 24, a first mixer 26a, a second mixer 26b, a third mixer 26c, and a fourth mixer 26d, which are generically referred to as "mixers 26" or "mixer 26", a complementation channel generating unit 28, a second oscillator 30, an acquiring unit 32, a first derivation unit 34, a second derivation unit 36, a determining unit 38, a storage 40, a generator 42, a setting unit 44, and a control unit 46. The complementation channel generating unit 28 includes a first SW 50a, a second SW 50b, a third SW 50c, and a fourth SW 50d, which are generically referred to as "SWs 50" or "SW 50", a first distributor 52a and a second distributor 52b, which are generically referred to as "distributors 52" or "distributor 52", a first adding unit 54a, a second adding unit 54b, a third adding unit 54c, and a fourth adding unit 54d, which are generically referred to as "adding units 54" or "adding unit 54", and a first adder 56a and a second adder 56b, which are generically referred to as "adders 56" or "adder 56".

The acquiring unit 32 acquires a channel matrix H. Here, the channel characteristics, between a plurality of transmitting antennas 14 and a plurality of not-shown receiving antennas 16, respectively, are arranged, as elements, in the channel matrix H. The channel matrix H is derived in the not-shown receiving apparatus 12, and the acquiring unit 32 acquires the channel matrix H from the receiving apparatus 12 via a radio link. Further, in order to have the receiving apparatus 12 derive the channel matrix H, the transmitting apparatus 10 transmits the signals for channel matrix estimation, in advance, to the receiving apparatus 12 from the plurality of transmitting antennas 14, respectively. Note that a known technique may be used for such a processing as this and therefore the detailed description thereof is omitted here.

The first derivation unit 34 performs SVD on the channel matrix H acquired by the acquiring unit 32 and thereby derives a singular value matrix Σ that is a diagonal matrix where singular values are arranged. Also, the first derivation unit 34 derives a weight matrix V, which is a unitary matrix, corresponding to the singular value matrix Σ. The first derivation unit 34 outputs the singular value matrix Σ to the second derivation unit 36 and outputs the weight vector V to the setting unit 44. The second derivation unit 36 acquires the singular values arranged in the singular value matrix Σ that has been derived by the first derivation unit 34. If the singular value matrix Σ is of size two rows by two columns, the second derivation unit 36 will acquire two singular values. Here, the larger of the two singular values is called a first singular value, whereas the smaller thereof is called a second singular value. Furthermore, the second derivation unit 36 divides the first singular value by the second singular value so as to derive a singular value ratio. The singular value ratio corresponds to a degree of difference between the singular values. The second derivation unit 36 outputs the singular value ratio to the determining unit 38.

The determining unit 38 determines whether or not the degree of difference derived in the second derivation unit 36 lies within a predetermined range. For example, it is determined whether the singular value ratio is between 1 and 1.4 (both inclusive) or greater than 1.4. This corresponds to determining whether the two singular values are close to each other or differ markedly from each other. A description is given herein of a relation between the channel matrix H and the singular value ratio. FIG. 3A to 3D shows examples of the channel characteristics in the communication system 100. FIG. 3A shows channel characteristics 80 formed between two transmitting antennas 14 and two receiving antennas 16. A first channel characteristic 80a is formed between the first transmitting antenna 14a and the first receiving antenna 16a. A second channel characteristic 80b is formed between the first transmitting antenna 14a and the second receiving antenna 16b. A third channel characteristic 80c is formed between the second transmitting antenna 14b and the first receiving antenna 16a. A fourth channel characteristic 80d is formed between the second transmitting antenna 14b and the second receiving antenna 16b.

For the clarity of explanation, assume herein that each channel characteristic 80 is represented by a real number. In FIG. 3A, assume that the first channel characteristic 80a is "1", the second channel characteristic 80b is "−0.4", the third channel characteristic 80c is "0.5", and the fourth channel characteristic 80d is "1.2". In this case, the first singular value will be "1.30", the second singular value will be "1.08", and the singular value ratio will be "1.2037". In this case, the degree of difference, namely the singular value ratio, is within the aforementioned range. The correlation of such the channel characteristics is said to be low.

Suppose that the influence of reflection gets smaller and, moreover, a long distance transmission is made. Then the channel characteristics between the transmitting antennas 14 and the receiving antennas 16, respectively, will be of almost identical phase and amplitude. This indicates that the spatial correlation is high. If the channel characteristics 80 are identical to each other, the channel matrix will be linearly dependent and therefore the inverse matrix cannot be evaluated. Even though the channel characteristics 80 are not completely identical, the channel characteristics 80 will be of almost identical phase and amplitude therefore the values of elements in the inverse matrix will be large. Hence, an overflow is likely to occur. In FIG. 3B, assume that the first channel characteristic 80a is "1", the second channel characteristic 80b is "0.8", the third channel characteristic 80c is "0.9", and the fourth channel characteristic 80d is "1.1". In this case, the first singular value will be "1.91", the second singular value will be "0.01", and the singular value ratio will be "191". This corresponds to a case where both the correlation at the transmitting side and the correction at the receiving side are large.

In FIG. 3C, assume that the first channel characteristic 80a is "1", the second channel characteristic 80b is "−0.7", the third channel characteristic 80c is "0.9", and the fourth channel characteristic 80d is "−0.6". In this case, the first singular value will be "1.63", the second singular value will be "0.02", and the singular value ratio will be "81.5". This corresponds to a case where the correlation at the transmitting side is large. In FIG. 3D, assume that the first channel characteristic 80a is "1", the second channel characteristic 80b is "0.8", the third channel characteristic 80c is "−0.8", and the fourth channel characteristic 80d is "−0.7". In this case, the first singular value will be "1.66", the second singular value will be "0.04", and the singular value ratio will be "41.5". This corresponds to a case where the correlation at the receiving side is large. Refer back to FIG. 2.

If the determining unit 38 determines that the singular value ratio is within the range, the storage 40 will store the channel matrix H acquired by the acquiring unit 32. That is, the storage 40 stores the latest channel matrix H that has been determined to lie within the range. If the determining unit 38 determines that the singular value ratio is outside the range, the generator 42 will generate a correction matrix W, based on the channel matrix H acquired by the acquiring unit 32 and a channel matrix stored in the storage 40 (hereinafter referred to as "approximately known channel matrix"). As discussed earlier, it is difficult for the receiving apparatus 12 to derive the inverse matrix for MIMO transmission in the cases of FIG. 3B to FIG. 3D. Accordingly, it is difficult to carry out the spatial multiplexing by the MIMO transmission. In order to cope with this, the generator 42 generates the correction matrix W and adds the thus generated correction matrix W to a real space channel at the time of transmission. This allows the generation of an uncorrelated channel in a mandatory manner and enables a multiplex space transmission. Note that the correction matrix W may be referred to as a "complementation channel" also.

A detailed description is given hereunder of the processing carried out by the generator 42. If the determining unit 38 determines that the singular value ratio is within the range, the generator 42 will not generate the correction matrix W. As a result, no correction matrix W will be added at the time of MIMO transmission. If, on the other hand, the determining unit 38 determines that the singular value ratio is outside the range, the generator 42 will generate a correction matrix W as follows.

$$\text{Correction matrix}|W|=\text{Approximately known channel matrix}|Y|-\text{Channel matrix}|H| \quad (9)$$

FIG. 4A to FIG. 4C show examples of the settings in the first adding unit 54a to the fourth adding unit 54d. The channel characteristics 80 in FIG. 4A to FIG. 4C correspond respectively to those in FIG. 3B to FIG. 3D. The approximately known channel matrix corresponds to FIG. 3A. In FIG. 4A, the derived correction matrix W is set in the adding units 54 for the channel characteristics 80 of FIG. 3B. As a result, even though the channel characteristics 80 as shown in FIG. 3B are present, the correlation similar to that of FIG. 3A is acquired. The same applied to FIG. 4B and FIG. 4C. Refer back to FIG. 2.

The setting unit 44 acquires the weight matrix V from the first derivation unit 34. If the weight matrix V is a matrix of two rows by two columns, for instance, then two transmission weight vectors, each of which is made up of two rows by one column, are contained in the weight matrix V. The setting unit 44 sets a transmission weight vector to the first multiplication unit 20a and the second multiplication unit 20b, and sets another transmission weight vector to the third multiplication unit 20c and the fourth multiplication unit 20d. The first multiplication unit 20a and the second multiplication unit 20b multiplies a stream signal by a transmission weight vector, whereas the third multiplication unit 20c and the fourth multiplication unit 20d multiplies another stream signal by another transmission weight vector. The first addition unit 22a adds up a multiplication result at the first multiplication unit 20a and a multiplication result at the third multiplication unit 20c. This (hereinafter referred to as a "first signal") corresponds to a signal to be transmitted from the first transmitting antenna 14a. Also, the second addition unit 22b adds up a multiplication result at the second multiplication unit 20b and a multiplication result at the fourth multiplication unit 20d. This (hereinafter referred to as a "second signal") corresponds to a signal to be transmitted from the second transmitting antenna 14b.

The first oscillator 24 generates a local signal having a predetermined frequency. The first mixer 26a carries out frequency conversion of the first signal using the local signal fed from the first oscillator 24, and the second mixer 26b carries out frequency conversion of the second signal using the local signal fed from the first oscillator 24. Assume herein, for example, that the frequency is converted into an intermediate frequency band. Also, assume that the first signal and the second signal on which the frequency conversion is done into intermediate frequency bands are also called a signal and a second signal, respectively.

If the determining unit 38 determines that the singular value ratio is within the range, the first SW 50a will output the first signal to the third SW 50c, and the third SW 50c will output the first signal to the third mixer 26c. If the determining unit 38 determines that the singular value ratio is within the range, the second SW 50b will output a second signal to the fourth SW 50d, and the fourth SW 50d will output the second signal to the fourth mixer 26d. This corresponds to bypassing the processing of the complementation channel generating unit 28 and corresponds to transmitting a computational result of the transmission weight vector, contained in the weight matrix V, and the stream signal, from the plurality of transmitting antennas 14.

The second oscillator 30 generates a local signal having a predetermined frequency. The third mixer 26c carries out frequency conversion of the first signal using the local signal fed from the second oscillator 30, and the fourth mixer 26d carries out frequency conversion of the second signal using the local signal fed from the second oscillator 30. Assume herein, for example, that the frequency is converted into a radio-frequency band. Also, assume that the first signal and the second signal on which the frequency conversion is done into radio-frequency bands are also called a signal and a second signal, respectively. The first transmitting antenna 14a transmits the first signal, whereas the second transmitting antenna 14b transmits the second signal.

If the determining unit 38 determines that the singular value ratio is outside the range, the first SW 50a will output the first signal to the first distributor 52a, and the second SW 50b will output the second signal to the second distributor 52b. The first distributor 52a outputs the first signal to the first adding unit 54a and the second adding unit 54b, and the second distributor 52b outputs the second signal to the third adding unit 54c and the fourth adding unit 54d. The first adding unit 54a appends a value of a corresponding element in the correction matrix W generated by the generator 42, to the first signal. Appending the value thereof corresponds to a multiplication performed using a vector operation. The second adding unit 54b to the fourth adding unit 54d each performs the similar processing.

The first adder 56a adds up an output signal fed from the first adding unit 54a and an output signal fed from the third adding unit 54c, and the second adder 56b adds up an output signal fed from the second adding unit 54b and an output signal fed from the fourth adding unit 54d. The third SW 50c outputs a signal, inputted from the first adder 56a, to the third mixer 26c, whereas the fourth SW 50d outputs a signal, inputted from the second adder 56b, to the fourth mixer 26d. If, in this manner, the spatial correlation is high, a computational result of the transmission weight vector, contained in the weight matrix, the stream signal and the correction matrix will be transmitted from the plurality of transmitting antennas 14. Thereby, the correction is reduced to a lower level.

Figure 5:
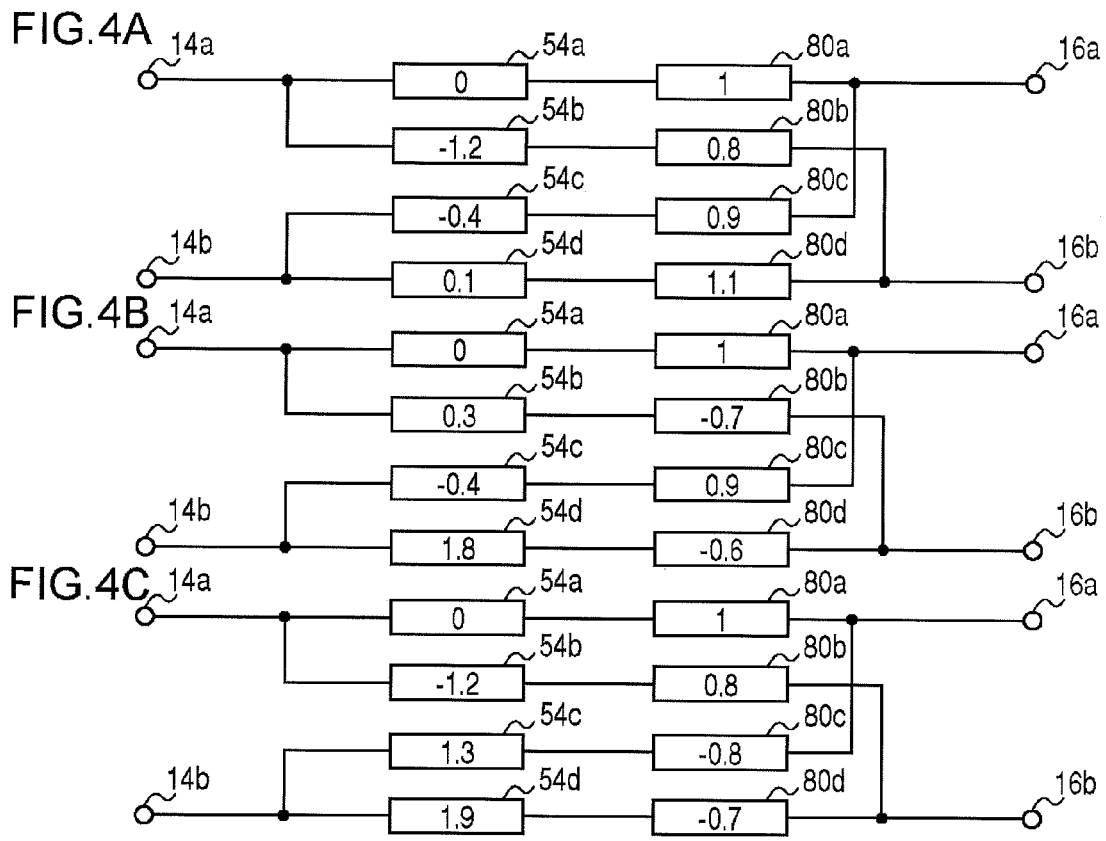
FIG. 5 shows a packet signal transmitted from the transmitting apparatus shown in FIG. 2.

FIG. 5 shows a packet signal transmitted from the transmitting apparatus 10. A signal on the top row corresponds to "a stream signal", whereas a signal on the bottom row corresponds to "another stream signal". A training signal, a complementation presence/absence signal and a data signal are arranged in this order in each stream signal. Here, the training signal corresponds to the aforementioned signal for channel estimation. The training signals are defined as follows. That is, the training signals are signals known to the not-shown receiving apparatus 12, and each training signal has a different pattern from each other in one stream signal and another stream signal.

The complementation presence/absence signal, which is a 1-bit signal, is used to convey to the receiving apparatus 12 whether or not a complementation has been done by the correction matrix W in the complementation channel generating unit 28. If, for example, the complementation presence/absence signal is "0", the complementation by the correction matrix W has not been done; if the complementation presence/absence signal is "1", the complementation by the correction matrix W has been done. In other words, if the computational result of the correction matrix W, the weight matrix and the stream signal is transmitted from the plurality of transmitting antennas 14, the use of the correction matrix W will be notified. The complementation presence/absence signal has an identical value in each stream signal. The data signals differ in two stream signals in order to be compatible with the MIMO transmission.

These structural components may be implemented hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

Figure 6:
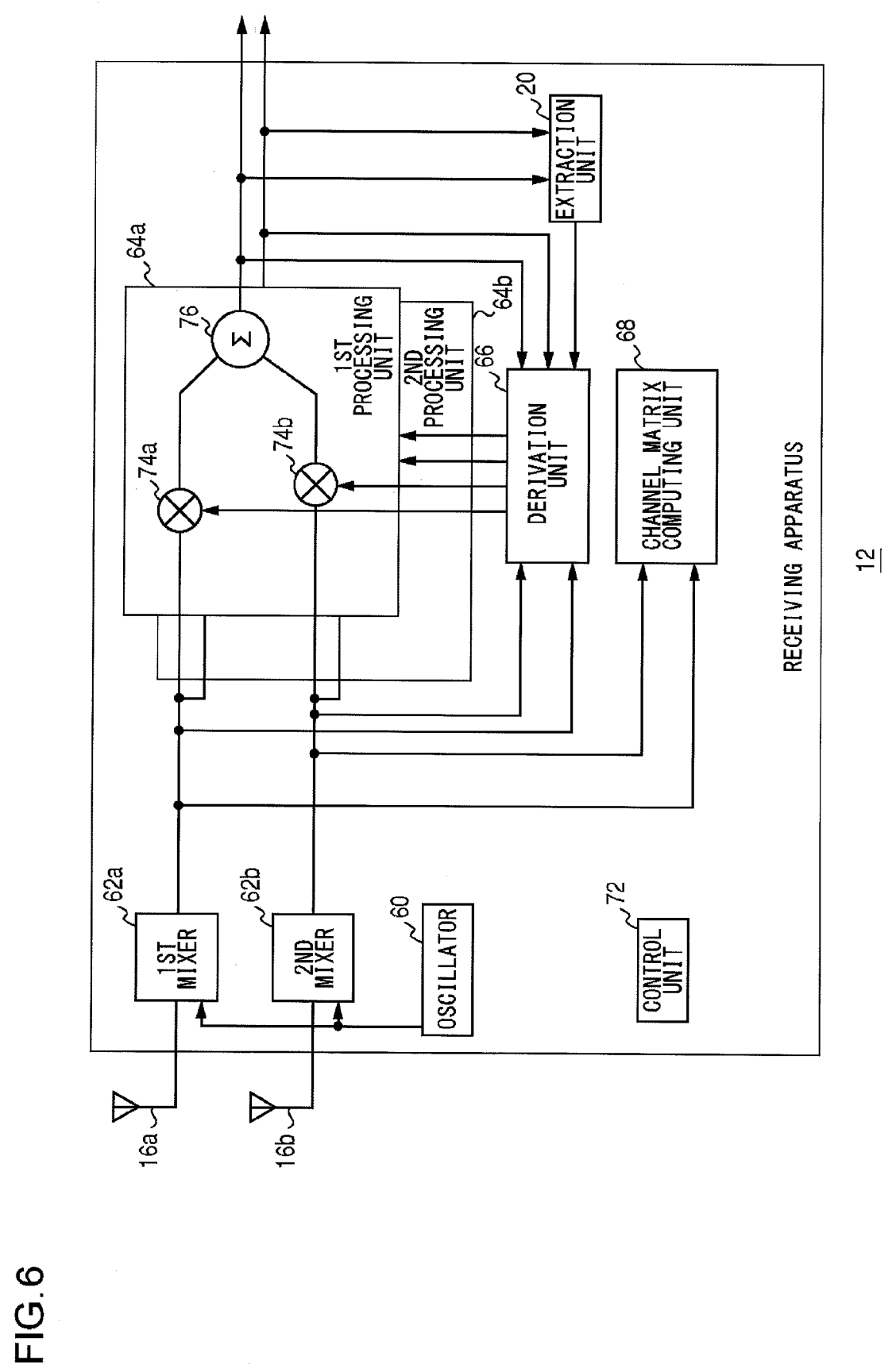

FIG. 6 shows a structure of the receiving apparatus 12. The receiving apparatus 12 includes an oscillator 60, a first mixer 62a and a second mixer 62b, which are generically referred to as "mixers 62" or "mixer 62", a first processing unit 64a and a second processing unit 64b, which are generically referred to as "processing units 64" or "processing unit 64", a derivation unit 66, a channel matrix computing unit 68, an extraction unit 70, and a control unit 72. The first processing unit 64a includes a first multiplication unit 74a and a second multiplication unit 74b, which are generically referred to as "multiplication units 74" or "multiplication unit 74", and an accumulation unit 76.

The oscillator 60 generates a local signal having a predetermined frequency. The first mixer 62a carries out frequency conversion of a signal, received by the first receiving antenna 16a, using the local signal fed from the oscillator 60. Also, the second mixer 62b carries out frequency conversion of a signal, received by the second receiving antenna 16b, using the local signal fed from the oscillator 60. Here, the frequency is converted into baseband, for example. The channel matrix computing unit 68 estimates the channel characteristics based on the signals fed from the first mixer 62a and the second mixer 62b, and thereby generates a channel matrix H. A known technique may be used to generate the channel matrix H and therefore the description thereof is omitted here. A signal where the transmission weight vector has not been transmitted in the not-shown transmitting apparatus 10 is used to estimate the channel characteristics. Furthermore, the thus generated channel matrix H is transmitted to the transmitting apparatus 10 via the radio link.

The derivation unit 66 receives the inputs of signals from the first mixer 62a and the second mixer 62b. Here, the signals received therefrom correspond to the signals where the transmission weight vector has been transmitted in the not-shown transmitting apparatus 10. The derivation unit 66 derives a receiving weight vector, based on the signals received therefrom, particularly the training signals. A known technique may be used to generate the receiving weight vector and therefore the description thereof is omitted here.

The processing unit 64 performs array synthesis on the signals fed from the first mixer 62a and the second mixer 62b, using the receiving weight vector derived by the derivation unit 66. Note that the first processing unit 64a carries out a process for one stream signal, whereas the second processing unit 64b carries out a process for another stream signal. For example, in the first processing unit 64a, the first multiplication unit 74a and the second multiplication unit 74b each performs the multiplication of the receiving vector, and the accumulation unit 76 accumulates their multiplication results. The extraction unit 70 extracts the complementation presence/absence signal from the array-synthesized signal. If the complementation presence/absence signal is "1", the extraction unit 70 will convey to the derivation unit 66 that the correction matrix W is in use. If the complementation presence/absence signal is "0", the extraction unit 70 may not convey thereto accordingly.

As described above, when the complementation presence/absence signal is "1", this indicates that the singular value ratio lies outside the predetermined range in the transmitting apparatus 10 and that the correction matrix W has been computed in the inputted signal. If the derivation unit 66 receives the input of notification from the extraction unit 70, the derivation unit 66 will stop deriving the receiving weight vector. At that time, the derivation unit 66 outputs the receiving weight vector, which has already been derived when the complementation presence/absence signal was "0", to the processing unit 64. The processing unit 64 uses the array synthesis by using the receiving weight vector fed from the derivation unit 66.

Figure 7:
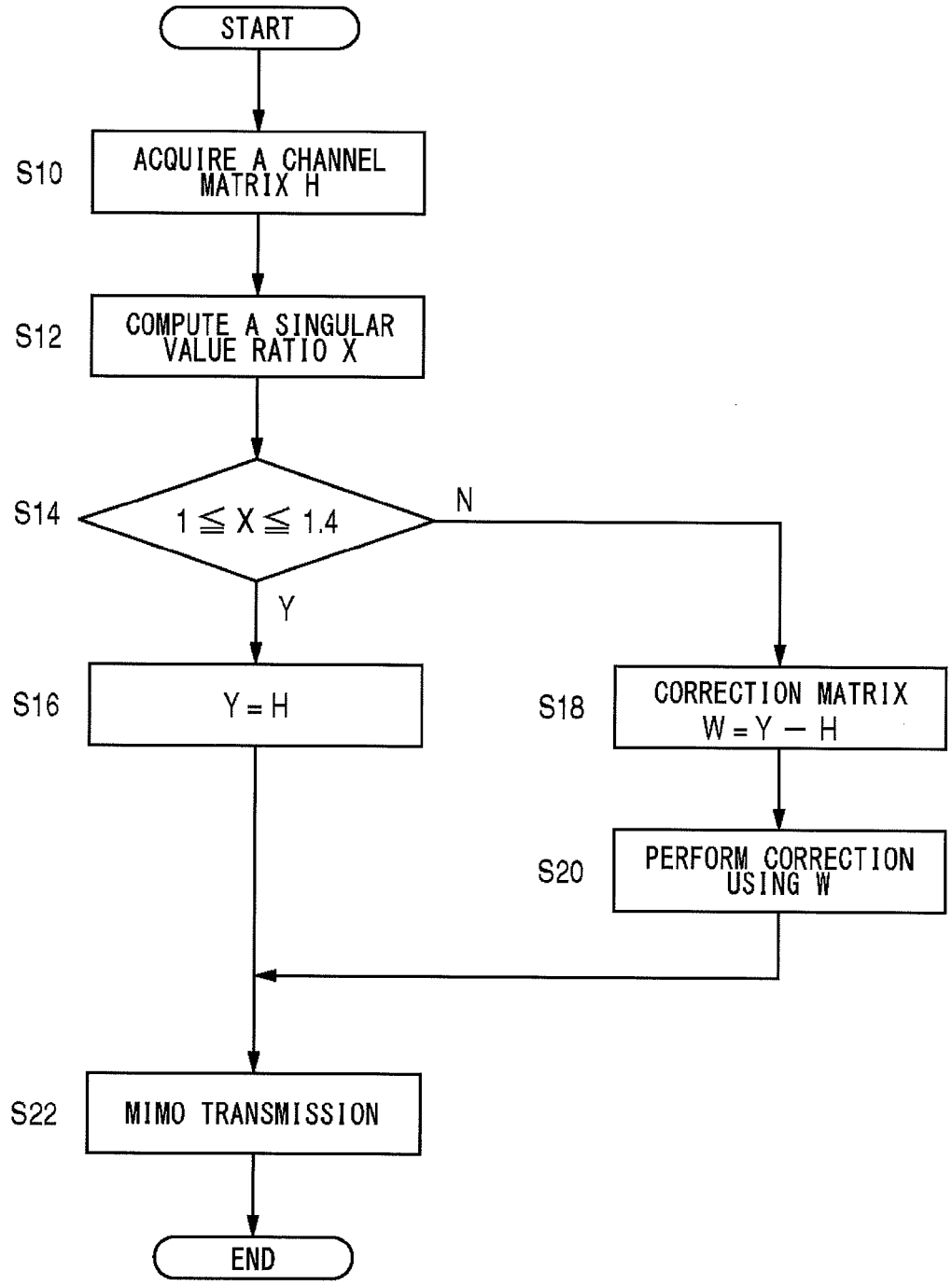
FIG. 7 is a flowchart showing a transmission procedure carried out by the transmitting apparatus of FIG. 2.

An operation of the communication system 100 configured as above is now described. FIG. 7 is a flowchart showing a transmission procedure carried out by the transmitting apparatus 10. The acquiring unit 32 acquires a channel matrix H (S10). The second derivation unit 36 computes a singular value ratio X (S12). If the singular value ratio X is greater than or equal to "1" and less than or equal "1.4" (Y of S14), the storage 40 will store the channel matrix H as an approximately known channel matrix Y (S16). The transmitting apparatus 10 carries out MIMO transmission (S22). If the singular value ratio X is not in a range of "1" to "1.4" (both inclusive) (N of S14), the generator 42 will subtract the channel matrix H from the approximately known channel matrix Y so as to generate a correction matrix W (S18). The complementation channel generating unit 28 performs correction using the correction matrix W (S20). The transmitting apparatus 10 carries out MIMO transmission (S22).

Figure 8:
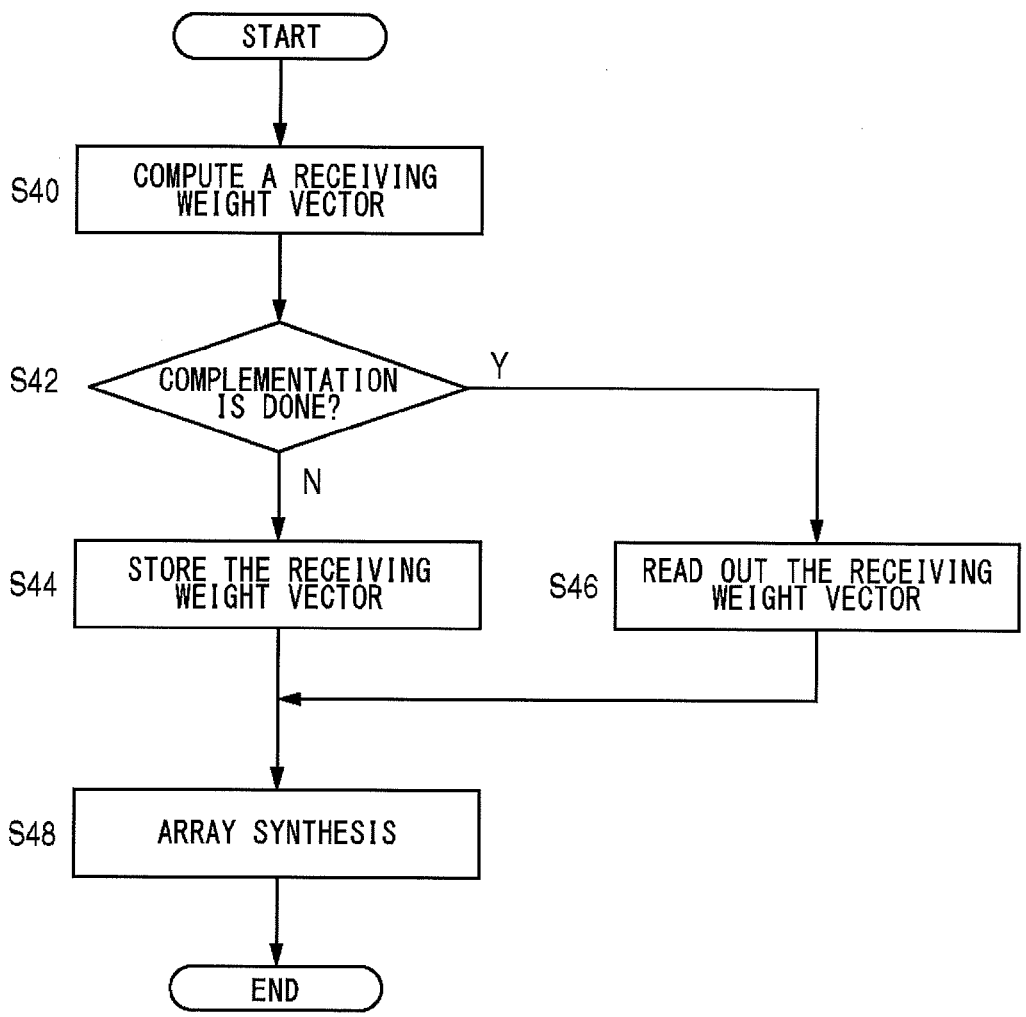
FIG. 8 is a flowchart showing a receiving procedure carried out by the receiving apparatus of FIG. 6.

FIG. 8 is a flowchart showing a receiving procedure carried out by the receiving apparatus 12. The derivation unit 66 computes a receiving weight vector (S40). If the extraction unit 70 has not extracted the complementation presence/absence signal "1" (N of S42), the derivation unit 66 will store the receiving weight vector (S44). The processing unit 64 performs array synthesis on the data signal (S48). If the extraction unit 70 has extracted the complementation presence/absence signal "1" (Y of S42), the derivation unit, 66 will read out the receiving weight vector (S46). The processing unit 64 performs array synthesis on the data signal (S48).

By employing the exemplary embodiments of the present invention, whether a combination of the transmission weight vector and the correction matrix is used or the transmission weight vector is used is determined according to the value of the singular value ratio. Thus, the correlation can be lowered as necessary. Also, where the spatial correlation is high, the correlation is lowered using the correction matrix. Thus, the multiplex transmission can be achieved in various types of channel environments. Also, the correction matrix is generated, based on a channel matrix whose singular value ratio lies within the range and a channel matrix whose singular value ratio lies outside the range. Thus, the corrected matrix can be brought close to a channel matrix whose singular value ratio lies within the range. Also, since the data multiplex transmission can be achieved even in various types of correlation space channels, a large amount of data can be transmitted smoothly. Also, since the use of a correction matrix is notified, an array synthesis processing suitable for the correction matrix can be carried out.

Also, whether a combination of the weight vector and the correction matrix is used or the weight vector is used is determined according to the degree of difference between the singular values. Thus, the multiplex transmission can be achieved in various types of channel environments. Also, only whether or not the singular value ratio lies within a predetermined range is determined. Thus, whether or not the spatial correlation is low can be immediately identified. This simple determination technique also reduces the occurrence of situations where a large amount of computing time is required such as when the rank of a matrix is deficient. Also, the spatial channel is complemented in such a manner that the solution of an approximately known channel matrix or an inverse matrix to be sought is stored in the receiving apparatus. Thus the channel matrix can be brought close to the approximately known channel matrix. Also, the computing time required to solve the inverse matrix can be markedly reduced.

The present disclosure has been described based on the exemplary embodiments. The exemplary embodiments are intended to be illustrative only, and it is understood by those skilled in the art that various modifications to constituting elements or an arbitrary combination of each process could be further developed and that such modifications are also within the scope of the present disclosure.

In the exemplary embodiments of the present invention, the number of transmitting antennas 14 and the number of receiving antennas 16 are both "2". Thus, the number of singular values contained in the singular value matrix is "2" as well. However, this should not be considered as limiting and, for example, the number of transmitting antennas 14 and the number of receiving antennas 16 may each be greater than "2", and the number of singular values contained in the singular value matrix may also be greater than "2". In such a case, the singular value ratio is acquired by dividing the maximum singular value by the minimum singular value. Also, the singular value ratio is acquired by dividing the maximum singular value by the second largest singular value. According to the present modification, the exemplary embodiments of the present invention can be applied to a case where the number of transmitting antennas 14 and the number of receiving antennas 16 are each greater than "2".

In the exemplary embodiments of the present invention, the determining unit 38 sets the predetermined range as a range of values greater than or equal to "1" and less than or equal to "1.4". However, this should not be considered as limiting and, for example, the upper bound may be a value other than "1.4". Such predetermined values may be determined through experiments, simulation runs and the like, for instance. According to the present modification, the optimum range can be set.

What is claimed is:

1. A transmitting apparatus comprising:
an acquiring unit configured to acquire a channel matrix, the channel matrix having elements that represent channel characteristics between a plurality of antennas at a transmitting side and a plurality of antennas at a receiving side, respectively;
a first derivation unit configured to derive a singular value matrix that is a diagonal matrix where singular values are arranged, by subjecting the channel matrix acquired by the acquiring unit, to singular value decomposition, and configured to derive a weight matrix which is a unitary matrix corresponding to the singular value matrix;
a second derivation unit configured to derive a degree of difference between the singular values arranged in the singular value matrix derived by the first derivation unit;
a determining unit configured to determine whether or not the degree of difference lies within a predetermined range; and
a transmitter configured to transmit, from the plurality of antennas, a result of computation of a weight vector, contained in the weight matrix, and a signal, when the determining unit determines that the degree of difference lies within the predetermined range, and configured to transmit, from the plurality of antennas, a result of computation of the weight vector, contained in the weight matrix, the signal, and a correction matrix, when the determining unit determines that the degree of difference lies outside the predetermined range.

2. A transmitting apparatus according to claim 1, further comprising:
a storage configured to store the channel matrix acquired by the acquiring unit, when the determining unit determines that the degree of difference lies within the predetermined range; and a generator configured to generate the correction matrix based on the channel matrix acquired by the acquiring unit and the channel matrix stored in the storage, when the determining unit determines that the degree of difference lies outside the predetermined range.

3. A transmitting apparatus according to claim 1, wherein, when the results of computation of the correction matrix, the weight matrix and the signal are transmitted from the plurality of antennas, the transmitting apparatus conveys the use of the correction matrix.

4. A receiving apparatus comprising:
a receiver configured to receive a signal from a transmitting apparatus via a plurality of antennas, wherein the transmitting apparatus derives a singular value matrix which is a diagonal matrix where singular values are arranged, and a weight matrix which is a unitary matrix corresponding to the singular value matrix, by subjecting a channel matrix to singular value decomposition, the channel matrix having elements that represent channel characteristics between a plurality of antennas at a transmitting side and the plurality of antennas at a receiving side, respectively, and wherein, when a degree of difference between the singular values arranged in the single value matrix lies within a predetermined range, the transmitting apparatus weights the signal with a transmission weight vector contained in the weight matrix;
a derivation unit configured to derive a receiving weight vector based on the signal received by the receiver; and
a processing unit configured to perform array synthesis on the signal received by the receiver, using the receiving weight vector derived by the derivation unit,
wherein, when the degree of difference between the singular values arranged in the single value matrix lies outside predetermined range, the receiver receives a signal computed with the transmission weight vector and a correction matrix,
wherein, when the degree of difference between the singular values arranged in the single value matrix lies outside predetermined range, the derivation unit stops deriving the receiving weight vector, and
wherein, when the degree of difference between the singular values arranged in the single value matrix lies outside the predetermined range, the processing unit performs array synthesis on the signal received by the receiver, using the receiving weight vector derived previously by the derivation unit.

5. A transmitting method comprising:
acquiring a channel matrix, having elements that represent channel characteristics between a plurality of antennas at a transmitting side and a plurality of antennas at a receiving side, respectively;
deriving a singular value matrix that is a diagonal matrix where singular values are arranged, by subjecting the channel matrix acquired to singular value decomposition, and deriving a weight matrix which is a unitary matrix corresponding to the singular value matrix;
deriving a degree of difference between the singular values arranged in the singular value matrix derived;
determining whether or not the degree of difference lies within a predetermined range; and
transmitting, from the plurality of antennas, a result of computation of a weight vector, contained in the weight matrix, and a signal, when the degree of difference lies within the predetermined range, and transmitting, from the plurality of antennas, a result of computation of the weight vector, contained in the weight matrix, the signal, and a correction matrix, when the degree of difference lies outside the predetermined range.

6. A receiving method comprising:

receiving a signal from a transmitting apparatus via a plurality of antennas, wherein the transmitting apparatus derives a singular value matrix which is a diagonal matrix where singular values are arranged, and a weight matrix which is a unitary matrix corresponding to the singular value matrix, by subjecting a channel matrix to singular value decomposition, the channel matrix having elements that represent channel characteristics between a plurality of antennas at a transmitting side and the plurality of antennas at a receiving side, respectively, and wherein, when a degree of difference between the singular values arranged in the single value matrix lies within a predetermined range, the transmitting apparatus weights the signal with a transmission weight vector contained in the weight matrix;

deriving a receiving weight vector based on the received signal; and performing array synthesis on the received signal, using the receiving weight vector derived, wherein, when the degree of difference between the singular values arranged in the single value matrix lies outside predetermined range, the receiving receives a signal computed with the transmission weight vector and a correction matrix, wherein, when the degree of difference between the singular values arranged in the single value matrix lies outside the predetermined range, the deriving stops deriving the receiving weight vector, and wherein, when the degree of difference between the singular values arranged in the single value matrix lies outside the predetermined range, the performing performs array synthesis on the received signal, using the receiving weight vector derived previously by the derivation unit.

* * * * *